United States Patent [19]

Cuiller et al.

[11] Patent Number: 5,761,966
[45] Date of Patent: Jun. 9, 1998

[54] CLAMPING DEVICE FOR A STEERING COLUMN

[75] Inventors: Dominique Noel Marie Cuiller, Levellois Perret; Ricardo Antonio Pastor, Paris, both of France

[73] Assignee: Delphi France Automotive Systems, La Garenne-Colombes, France

[21] Appl. No.: 667,559

[22] Filed: Jun. 21, 1996

[30] Foreign Application Priority Data

Feb. 27, 1996 [GB] United Kingdom ............ 9604106

[51] Int. Cl.⁶ ............................................ B62D 1/18
[52] U.S. Cl. ..................... 74/493; 74/531; 248/299
[58] Field of Search ....................... 74/493, 531; 248/299

[56] References Cited

U.S. PATENT DOCUMENTS

| 2,185,779 | 1/1940 | Tveidt | 74/493 |
| 3,504,569 | 4/1970 | Zoltok | 74/493 |
| 3,548,675 | 12/1970 | Crimes et al. | 74/493 |
| 3,803,939 | 4/1974 | Schenten | 74/493 |
| 4,244,236 | 1/1981 | Sylvester | 74/493 |
| 5,088,767 | 2/1992 | Hoblingre et al. | 74/493 |

FOREIGN PATENT DOCUMENTS

| 0 600 700 A1 | 6/1994 | European Pat. Off. |
| 2 259 353 | 3/1993 | United Kingdom |
| 2273338 | 6/1994 | United Kingdom |

*Primary Examiner*—Charles A. Marmor
*Assistant Examiner*—David M. Fenstermacher
*Attorney, Agent, or Firm*—Saul Schwartz

[57] ABSTRACT

A clamping device for a steering column comprising a pair of brackets, one of which is positioned inside the other, each bracket having a pair of spaced-apart, substantially parallel walls. The walls of the inner bracket lie alongside the walls of the outer bracket. The walls have aligned apertures; a bolt extending through the apertures and rotatable about its longitudinal axis; a tubular sleeve surrounding the bolt between the walls of the inner bracket and having a surface at each end engaging the walls of the inner bracket; a nut threadably attached to the bolt at one end and having a surface engaging one of the walls of the outer bracket, the nut being fixed relative to the longitudinal axis; an annular spacer positioned around the bolt and having a surface engaging the other wall of the outer bracket, the spacer being fixed relative to the longitudinal axis; and a lever secured to the bolt adjacent the spacer and pivotable about the longitudinal axis; wherein the surfaces on the nut and the spacer which engage the walls of the outer bracket are substantially convex; and wherein the surfaces on the sleeve which engage the walls of the inner bracket are substantially concave. The clamping device provides increased holding force without increase of operator force on lever.

5 Claims, 1 Drawing Sheet

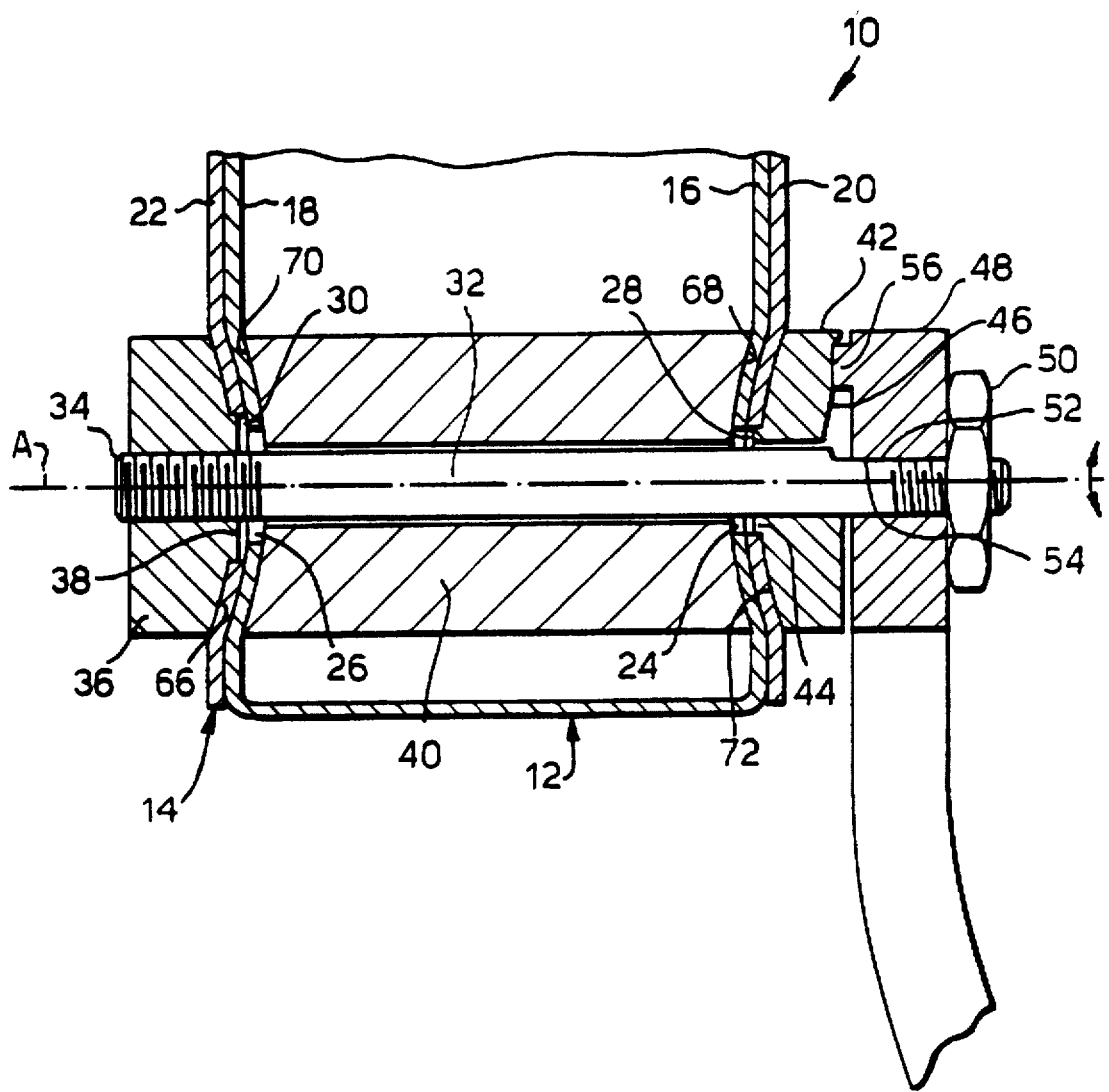

CLAMPING DEVICE FOR A STEERING COLUMN

The present invention relates to a clamping device for a steering column of a motor vehicle in which the steering column is capable of being adjustably tilted and/or adjusted in length (telescopic).

BACKGROUND OF THE INVENTION

Known adjustable steering columns have a clamping device which consists of a pair of brackets. One bracket is secured to a portion of the body of a motor vehicle. The other bracket is secured to the steering column. The brackets each have a pair of substantially parallel, spaced-apart walls. One bracket lies inside the other bracket such that a wall of one bracket is adjacent a wall of the other bracket. A threaded bolt extends through aligned apertures in the walls and a metallic sleeve welded between the walls of the inner bracket. A nut is screw threaded on one end of the bolt. A manually-operable lever is attached to the other end of the bolt. A spacer is positioned around the bolt between the lever and the wall of the adjacent bracket. The lever has a follower which acts on a cam surface on the spacer. Pivotal movement of the lever about the bolt axis in one direction draws the nut toward the spacer to clamp the walls of the brackets together. Pivotal movement of the lever in the opposite direction moves the nut away from the spacer to release the clamping force exerted on the walls to allow adjustment of the steering column.

SUMMARY OF THE INVENTION

It is an object of the present invention to provide an improvement to the above-described prior known arrangement.

A clamping device for a steering column in accordance with the present invention comprises a pair of brackets, one of which is positioned inside the other, each bracket having a pair of spaced-apart, substantially parallel walls, the walls of the inner bracket lying alongside the walls of the outer bracket, the walls having aligned apertures; a bolt extending through the apertures and rotatable about its longitudinal axis; a tubular sleeve surrounding the bolt between the walls of the inner bracket and having a surface at each end engaging the walls of the inner bracket; a nut threadably attached to the bolt at one end and having a surface engaging one of the walls of the outer bracket, the nut being fixed relative to the longitudinal axis; an annular spacer positioned around the bolt and having a surface engaging the other wall of the outer bracket, the spacer being fixed relative to the longitudinal axis; and a lever secured to the bolt adjacent the spacer and pivotable about the longitudinal axis; wherein the surfaces on the nut and the spacer which engage the walls of the outer bracket are substantially convex; and wherein the surfaces on the sleeve which engage the walls of the inner bracket are substantially concave.

Relative to the above-described prior known arrangement, the present invention provides a clamping device in which the holding forces of the clamping system are greatly increased without the need for the operator to exert additional force when pivoting the lever to actuate the clamping device.

BRIEF DESCRIPTION OF THE DRAWING

The single drawing FIGURE is a cross-sectional view of a clamping device in accordance with the present invention when the holding forces are applied.

DESCRIPTION OF A PREFERRED EMBODIMENT

Referring to the drawing, a clamping device 10 in accordance with the present invention comprises a pair of brackets 12,14. One bracket 12 is positioned inside the other bracket 14. The inner bracket 12 comprises a pair of walls 16,18 which are spaced apart and generally substantially parallel. The outer bracket 14 has a corresponding pair of walls 20,22 which lie alongside the walls 16,18 of the inner bracket 12. One of the brackets is secured to a body portion (not shown) of a motor vehicle. The other bracket is secured to the steering column (not shown) of the motor vehicle. Relative movement of the brackets 12,14 allows the steering column to tilt and/or adjust telescopically as is required by the vehicle operator.

The walls 16,18 of the inner bracket 12 have aligned apertures 24,26, respectively. The apertures 24,26 are preferably rectangular in shape with the longer axis aligned with the axis of rotation of the steering column shaft (not shown) to provide the telescopic adjustment. Similarly, the walls 20,22 of the outer bracket 14 have aligned apertures 28,30 respectively, which also align with the apertures 24,26 in the inner bracket 12. The apertures 28,30 are preferably rectangular in shape with the longer axis substantially perpendicular with the axis of rotation of the steering column shaft (not shown) to provide the tilt adjustment.

A bolt 32 having a longitudinal axis A extends through the aligned apertures 24–30. One end 34 of the bolt 32 is threaded. A nut 36 threadably engages the threaded end 34 of the bolt 32 and engages the wall 22 of the outer bracket 14. The nut 36 has a portion 38 which extends into the aperture 30 in the wall 22. The portion 38 of the nut 36 is shaped relative to the aperture 30 such that the nut cannot rotate about axis A. A tubular sleeve 40 surrounds the bolt 32 between the walls 16,18 of the inner bracket 12 and engages the walls 16,18.

An annular spacer 42 surrounds the bolt 32 and engages the wall 20 of the outer bracket 14. The spacer 42 has a portion 44 which extends into the aperture 28 in the wall 20. The portion 44 is shaped relative to the aperture 28 such that the spacer 42 cannot rotate about axis A. The spacer 42 has a cam surface 46 directed away from the wall 20. A lever 48 is mounted on the bolt 32 adjacent the spacer 42. A nut 50 retains the lever 48 on the bolt 32. In the area where the lever 48 is mounted on the bolt 32, the bolt has a flattened surface portion 52 and the lever has a correspondingly-shaped aperture 54. This arrangement ensures that the lever 48 and the bolt 32 are secured together in such a way that when the lever 48 is pivotally moved about the axis A by the vehicle operator, the bolt 32 also rotates about axis A. The lever 48 has a follower 56 which engages the cam surface 46 on the spacer 42. Pivotal movement of the lever 48 about the axis A in one direction will cause the bolt 32 to rotate relative to the nut 36, and the follower 56 to move across the cam surface 46, to draw the nut toward the spacer 42. This action exerts a clamping force on the walls 16–22 of the brackets 12,14 to secure the relative position of the brackets, and hence secure the steering column in a required position. Pivotal movement of the lever 48 about axis A in the opposite direction releases the clamping force to allow the steering column to be adjusted as required.

The arrangement as thus far described is known. In accordance with the present invention, the nut 36 at the threaded end 34 of the bolt 32 has a curved (convex) surface 66 which engages the wall 22 of the outer bracket 14. The opposed ends of the sleeve 40 have curved (concave)

surfaces 68,70 which engage the walls 16,18, respectively, of the inner bracket 12. The spacer 42 has a curved (convex) surface 72 which engages the wall 20 of the outer bracket 14. With this arrangement, during clamping of the brackets 12,14, the holding forces are significantly increased without the need for the vehicle operator to increase the force that is applied to the lever 48. This increase in clamping force is due to a combination of friction between the parts and due to a partial deformation of the walls 16–22 due to the curved surfaces 66–72. The walls 16–22 are normally (when the clamping device 10 is not operating) substantially flat, and are deformed in the area around the apertures 24–30 to have a similar concave configuration during the clamping operation. The dimensions of the curved surfaces 66–72 and/or the elasticity of the walls 16–22 are preferably such that the walls 16–22 are not permanently deformed during the clamping operation, but return to a substantially flat configuration on release of the holding forces.

What is claimed is:

1. A clamping device for a steering column comprising:

a pair of brackets, one of which is positioned inside the other, each bracket having a pair of spaced-apart, substantially parallel elastically deformable planar walls, the planar walls of the inner bracket lying alongside the planar walls of the outer bracket, the planar walls of the inner and the outer brackets having aligned apertures;

a bolt extending through the aligned apertures and rotatable about a longitudinal axis of the bolt;

a tubular sleeve surrounding the bolt between the walls of the inner bracket and having a concave surface at each end facing the planar walls of the inner bracket;

a nut threadably attached to the bolt at one end and having a convex surface facing one of the planar walls of the outer bracket opposite the concave surface on one end of the tubular sleeve, the nut being nonrotatable about the longitudinal axis of the bolt relative to the outer bracket;

an annular spacer positioned around the bolt and having a convex surface facing the other planar wall of the outer bracket opposite the concave surface on the other end of the tubular sleeve, the spacer being nonrotatable about the longitudinal axis of the bolt relative to the outer bracket;

a lever secured to the bolt adjacent the spacer and pivotable as a unit with the bolt about the longitudinal axis of the bolt; and a cam means operative when the lever is pivoted about the longitudinal axis of the bolt to squeeze together the convex surface on the nut and the concave surface on the one end of the tubular sleeve and to squeeze together the convex surface on the spacer and the concave surface on the other end of the tubular sleeve whereby the planar walls of the inner and the outer brackets between the concave and the convex surfaces are squeezed together and elastically deformed in the shape of the concave and the convex surfaces to frictionally and mechanically couple together the inner and the outer brackets.

2. The clamping device recited in claim 1 wherein the convex surfaces of the nut and spacer and the concave surfaces of the sleeve are substantially partially spherical.

3. The clamping device recited in claim 2 wherein the nut has a portion which extends into the aperture in the adjacent wall of the outer bracket, and wherein the portion of the nut is shaped relative to the aperture to prevent rotation of the nut about the longitudinal axis of the bolt relative to the outer bracket.

4. The clamping device recited in claim 3 wherein the spacer has a portion which extends into the aperture in the adjacent wall of the outer bracket, and wherein the portion of the spacer is shaped relative to the aperture to prevent rotation of the nut about the longitudinal axis of the bolt relative to the outer bracket.

5. The clamping device recited in claim 4 wherein the cam means comprises a cam surface on the spacer which is engaged by a follower on the lever.

* * * * *